(12) United States Patent
Lumay et al.

(10) Patent No.: US 10,677,753 B2
(45) Date of Patent: Jun. 9, 2020

(54) METHOD TO MEASURE THE ABILITY OF A FLOWING POWDER TO ELECTROSTATICALLY CHARGE AND MEASUREMENT DEVICE

(71) Applicant: UNIVERSITE DE LIEGE, Angleur (BE)

(72) Inventors: Geoffroy Lumay, Liege (BE); Julien Schockmel, Liege (BE); Nicolas Vandewalle, Liege (BE); Frederic Boschini, Liege (BE)

(73) Assignee: UNIVERSITE DE LIEGE, Angleur (BE)

(*) Notice: Subject to any disclaimer, the term of this patent is extended or adjusted under 35 U.S.C. 154(b) by 177 days.

(21) Appl. No.: 15/508,943

(22) PCT Filed: Aug. 13, 2015

(86) PCT No.: PCT/EP2015/068694
§ 371 (c)(1),
(2) Date: Mar. 6, 2017

(87) PCT Pub. No.: WO2016/037796
PCT Pub. Date: Mar. 17, 2016

(65) Prior Publication Data
US 2017/0284965 A1    Oct. 5, 2017

(30) Foreign Application Priority Data
Sep. 8, 2014    (EP) ..................................... 14183866

(51) Int. Cl.
*G01N 27/60*    (2006.01)

(52) U.S. Cl.
CPC .................................... *G01N 27/60* (2013.01)

(58) Field of Classification Search
CPC ...................................................... G01N 27/60
See application file for complete search history.

(56) References Cited

U.S. PATENT DOCUMENTS

| 3,753,102 | A | * | 8/1973 | Beck | ..................... | G01N 27/60 |
| | | | | | | 324/109 |
| 6,045,053 | A | * | 4/2000 | Ruud | ..................... | B05B 5/047 |
| | | | | | | 239/3 |

(Continued)

OTHER PUBLICATIONS

Peter M Ireland et al: "Analysis and comparison of particle tribochargers", Minerals Engineering, Pergamon Press, Oxford, GB, vol. 24, No. 8, Apr. 7, 2011 (Apr. 7, 2011), pp. 914-922, XP028387265, ISSN: 0892-6875, DOI: 10.1016/J.Mineng.*

(Continued)

*Primary Examiner* — Akm Zakaria
(74) *Attorney, Agent, or Firm* — Jacobson Holman, PLLC.

(57) ABSTRACT

A method and measurement device for measuring the ability of a flowing powder to electrostatically charge comprising a conduit comprised of a straight upper part fluidly connected to a straight lower part, the upper part being positioned at a first angle to the horizontal and the lower part being positioned at a second angle to the horizontal and wherein upper and lower part are positioned at a third angle relative to each other defining a bend at the intersection of the upper and lower part, wherein the upper part is provided with a supply opening for the powder and the lower part is provided with a discharge opening to discharge the powder and a faraday cup is connected to an electrometer positioned relative to the discharge opening to receive powder the from the conduit.

8 Claims, 5 Drawing Sheets

(56) References Cited

U.S. PATENT DOCUMENTS

| | | | |
|---|---|---|---|
| 6,817,553 B2* | 11/2004 | Steur | B05B 1/1627 |
| | | | 239/223 |
| 2002/0047712 A1* | 4/2002 | Weick | G01N 27/60 |
| | | | 324/453 |
| 2003/0164709 A1* | 9/2003 | Simonsson | B05B 5/047 |
| | | | 324/452 |

OTHER PUBLICATIONS

Matsusaka et al: "Triboelectric charging of powders: A review", Chemical Engineering Science, Oxford, GB, vol. 65, No. 22, Nov. 15, 2010 (Nov. 15, 2010), pp. 5781-5807, XP027394884, ISSN: 0009-2509.*

International Search Report, dated Sep. 28, 2015 (2 pages).

Peter M. Ireland et al., Minerals Engineering, "Analysis and comparison of particle tribocharges", vol. 24, No. 8, Apr. 7, 2011, pp. 914-922, cited in the Interanational Search Report (10 pages).

S. Matsusaka et al., Chemical Engineering Science, "Triboelectric charging of powders: A review", vol. 65, No. 22, Nov. 15, 2010, pp. 5781-5807, cited in the International Search Report (28 pages).

Peter M. Ireland, Powder Technology, "Triboelectrification of particulate flows on surfaces: Part I—Experiments", vol. 198, Nov. 20, 2009, pp. 189-198 (10 pages).

* cited by examiner

METHOD TO MEASURE THE ABILITY OF A FLOWING POWDER TO ELECTROSTATICALLY CHARGE AND MEASUREMENT DEVICE

BACKGROUND OF THE INVENTION

The invention is directed to a method to measure the ability of a flowing powder to electrostatically charge by allowing the powder to flow under the influence of gravity and measuring the electrostatic charge of the powder. The invention is also directed to a measurement device to measure the ability of a flowing powder to electrostatically charge.

It is well known in the art that electrostatic charges are created inside a powder during a flow. This apparition of electric charges is due to the triboelectric effect, which is a charge exchange at the contact between two solids. During the flow of a powder inside a device, such as a mixer, a silo or a conveyor, the triboelectric effect takes place at the contact between the solid powder particles and at the contact surface between these particles and the device. In particular, triboelectric effect takes place when two particles are sliding on each other or when a particle is sliding on a surface or when a particle impacts an other particle or when a particle impacts a surface. Therefore the characteristics of the powder and the properties of the material used to build the device are important parameters.

The apparition of electric charges inside a powder can produce sparks and cause explosion hazards. In addition, the electrostatic charging during powder particle flow induces agglomeration and segregation which may cause dosage problems. In some applications, the apparition of electric charges inside a powder is an advantage. The best-known application based on powder electrification is the electrophotography. The powder coating process is also based on the adhesion of charged powder particles onto a surface. In granular mixtures, the dependence of the electrification on the powder particles is interesting in separation techniques.

In order to optimize the processes used in these applications, a method and measurement devices are used to measure the ability of a powder to be electrostatically charged. Such methods and devices may be advantageously used to test the effect with respect to the electrostatic charge of an antistatic additive, the effect of the different powder characteristics and/or the effect of the material of the above referred to device. A review article by S. Matsusaka et al in Chemical Engineering Science 65: 5781-5807, 2010 describe different methods and devices to measure the ability of a powder to be electrostatically charged. These methods include the so-called cascade method on an inclined plate, the flow method on a vibrated plate, the fluidized bed method, the centrifugal method and the cyclonic method.

In an article of Peter Ireland (Powder Technology 198 (2010) 189-198) a method is described wherein the accumulated electrostatic charge of a powder and the mechanical attributes of a particulate flow are investigated using a flat stainless steel slide. The powder is feed on the top of the inclined plane by a funnel filled with the powder. With the inclined plane technique of this article, the powder is spreading over the whole plane and the grains are sliding, rolling and bouncing on the plane.

The above methods have the disadvantage that they are difficult to use in practice for all type of particles or grains and furthermore give fluctuating results. In particular, highly cohesive powders will not flow regularly through the aperture of the feeding funnel used in the inclined plane technique. On the other hand, the grains submitted to multiple bounce with random reorientation may also fall outside the plane in the inclined plane technique. Finally, these methods do not concern dense flows. Therefore, the results obtained with these methods are difficult to compare with triboelectric charging effects observed in devices wherein the powder is present in a more dense composition.

BRIEF SUMMARY OF THE INVENTION

The present invention aims to overcome these limitations.

This aims is achieved by the following method to measure the ability of a flowing powder to electrostatically charge by allowing the powder to flow through a conduit under the influence of gravity and measuring the electrostatic charge of the powder as discharged from the conduit, wherein the conduit is comprised of a straight upper part fluidly connected to a straight lower part, the upper part being positioned under a first angle with the horizontal and the lower part being positioned under a second angle with the horizontal and wherein upper and lower part are positioned under a third angle relative to each other defining a bend at the intersection of the upper and lower part. By horizontal, one means a plane perpendicular to a gravity axis.

Such a conduit comprising two parts in a V-shape design around an horizontal plan, advantageously simulates a powder flowing in a dense flow regime but also advantageously takes into account the impact of the powder falling from the straight upper part into the second lower part of the conduit against an internal wall of the lower part of the conduit. Such a conduct therefore advantageously simulates both main mechanisms leading to powder electrostatically charging in an industrial device.

The invention is also directed to a measurement device for a method to measure the ability of a flowing powder to electrostatically charge comprising a conduit comprised of a straight upper part fluidly connected to a straight lower part, the upper part being positioned under a first angle with the horizontal and the lower part being positioned under a second angle with the horizontal and wherein upper and lower part are positioned under a third angle relative to each other defining a bend at the intersection of the upper and lower part, wherein the upper part is provided with a supply opening for the powder and the lower part is provided with a discharge opening to discharge powder and a faraday cup connected to an electrometer positioned relative to the discharge opening such to receive powder from the conduit.

Applicants found that by using the conduit, particularly a tube having the two straight and inclined parts and the connection between said parts a powder flow may be obtained which more closely resembles the dense flow of powders in a commercial device. Further the powder will experience a free fall when flowing from the upper part to the lower part of the conduit. These two different flowing regimes in the method and device more closely simulates the flow regimes in a commercial device. These aspects of the invention provide a method and device which results in a prediction of the ability of a powder to electrostatically charge which is more closely to the behaviour of the powder in a commercial device.

The invention and its further preferred embodiments shall be described in more detail below.

The method according to the invention is especially suited to be performed in a standardised manner. This allows comparison between measurements performed at different locations and by different users. Applicants found that the below preferred configuration and conditions provide a practical method and device to perform the measurements on a powder. It is nevertheless easily conceivable to deviate from these configurations and conditions and still benefit from the advantages of the present invention.

Measuring the electrostatic charge of the powder as discharged from the conduit in the method is suitably performed in a so-called Faraday cup. Preferably the charged powder falls into such a Faraday cup positioned below a discharge opening in the conduit. When a certain amount of powder is collected in the Farady cup the total value of the electric charge Q present in the collected powder is measured by means of an electrometer. Suitably the electrometer is optimized for the measurement of charged powders, wherein the measurement range is suitably between from $10^{-10}$ C to $10^{-6}$ C.

Optionally, this charge expressed in Coulomb is divided by the sample powder mass M of the collected powder to obtain a charge density q expressed in Coulomb per kilogram. The sample powder mass may be known upfront or more suitably the weight of the powder as discharged into the Faraday cup is measured.

The powder to be measured may be any powder and is to mean and include any particulate, granular, pulverized or finely divided solid particles of material which may be electrostatically charged.

The temperature, pressure and humidity at which the method is performed may be chosen to mimic the actual conditions of for example the commercial device in which the powders will eventually be used. For example the relative air humidity and the ambient temperature are well known in the art to influence the flowing properties of powders and their ability to be electrostatically charged. Therefore, some industrial processes involving powder are sensitive to the meteorological conditions. The modification of the powder flowing properties due to humidity variations is mainly related to the electric charges present inside the powder. A low relative humidity strengthens the triboelectric effect while high relative humidity leads to a dissipation of the electric charges. It has been found that the method and measurement device according to the invention is very suitable to quantify this complex effect at different hygrometric conditions.

The material of the conduit suitably matches the material of the device in which the powder will be used on a commercial scale. The material of the conduit may be a conducting material, such as for example stainless steel, steel or aluminum, or an isolating material, such as for example glass or a polymer such as for example ABS, HDPE or PVC.

Suitably in the method the conduit is subjected to a vibration. This enhances the flow of powder through the conduit. The frequency of the vibration may vary between 10 Hz and 100 Hz. The method suitably includes the following steps wherein a vibrator is switched on and is tuned to shake the conduit with a selected vibration strength and frequency. A certain amount of powder to be measured is suitably gently poured into an inlet opening at the upper end of the conduit. In this manner a certain mass of powder will flow inside the conduit under force of gravity and enhanced by the applied vibration to finally fall in the Faraday cup.

The conduit preferably has the dimensions as described below.

DETAILED DESCRIPTION OF THE INVENTION

Use will be made of FIGS. 1-9 to describe the conduit used in the method and/or as part of the measurement device according to the present invention.

The upper and lower part of the conduit may be positioned in different vertical planes. Suitably the upper and lower part of the conduit are positioned in the same vertical plane. The first and second angle with the horizontal, being the smallest angle with the horizontal of respectively the upper and the lower part of the conduit, may be different or the same. In the illustrated embodiment the first angle is equal to the second angle. The first angle may be between 30° and 55°. The second angle may be between 30° and 55°.

Figure 1:
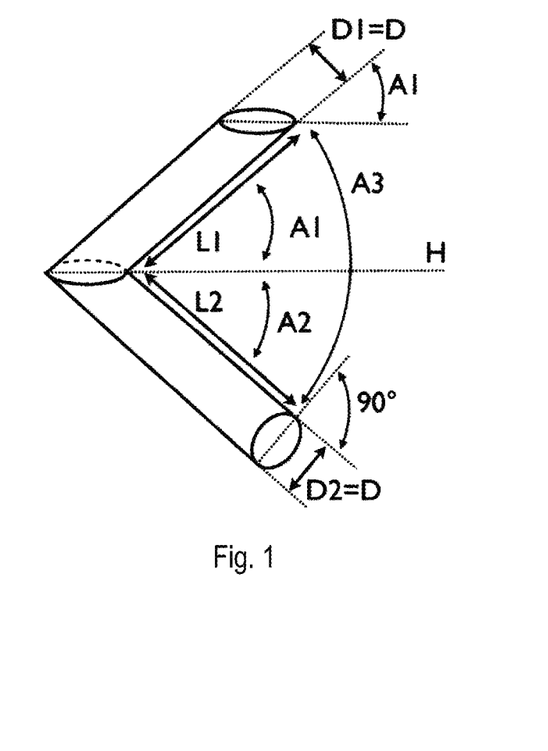
FIG. 1: illustrates one embodiment of the V-tube according to the invention wherein angle A1 is equivalent to angle A2.

The upper and lower part are positioned under a third angle relative to each other defining a bend at the intersection of the upper and lower part. Suitably this bend is a sharp bend resulting in that the two parts form a V-shape conduit as shown in FIG. 1. This sharp V-shaped bend will result in that the powder will drop a certain distance when flowing through the conduit at the intersection of the two parts. The third angle may be between 60° and 110°.

In the method the powder is supplied to a supply opening of the upper part. The supply opening of the upper part may have any design and is may be a cut-off of the conduit in the horizontal plane as in FIG. 1. In the method the powder is discharged from the lower part of the conduit via a discharge opening in the conduit. The discharge opening may have any design and may be a straight cut-off of the conduit as in FIG. 1.

The conduit may in principle have any closed cross-sectional design, such as rectangular or circular. Preferably the conduit is a tube to simulate dense flows.

The conduit may be electrically isolated, connected to the ground or connected to a generator to adjust the electric potential of the conduit. Preferably, the conduit is connected to the ground to mimic the actual conditions of for example the commercial device in which the powders will eventually be used.

As shown by FIG. 1, the main part of the powder electrometer is a V-tube. The V-tube is an assembly of two tubes respectively of length L1 and 12 and internal diameter D1 and D2. For sake of simplicity L1 and L2 and D1 and D2 are preferably equivalent.

The upper tube in FIG. 1 is cut with an angle A1 on both sides. The lower tube is cut with an angle A2 on one side and an angle of 90° on the other side. Both tubes are connected to form a V shape with an angle A3=A1+A2. The connection can be a welding, a gluing or a mechanical assembly with an adapter in case both upper and lower tubes have different internal diameter D1 and D2 or different angle A1 and A2. For sake of simplicity A1 and A2 are preferably equivalent.

Figure 2:
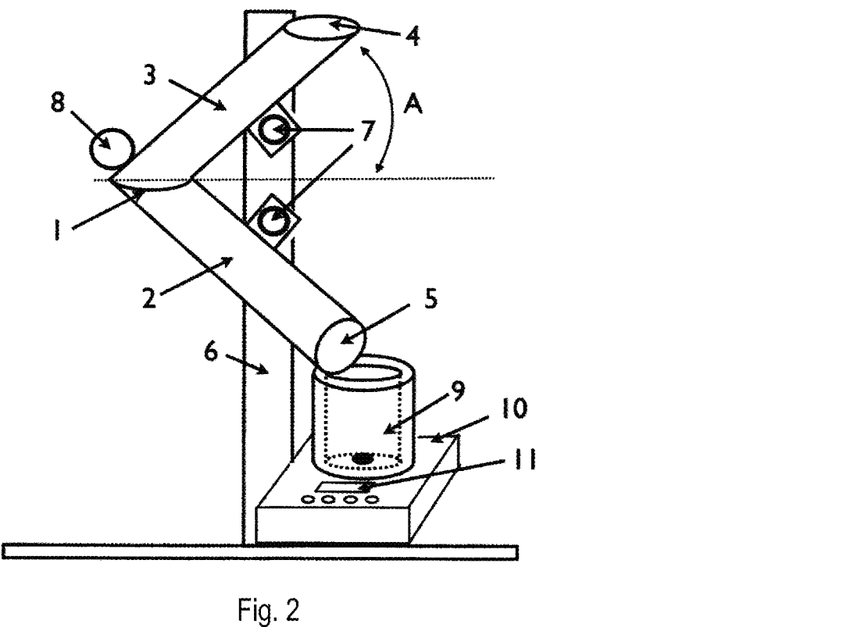
FIG. 2: illustrates one embodiment of the measurement device according to the invention wherein the supply opening (4) is a cut off of tube (3) in an horizontal plane and A=A3/2.

In FIG. 2 it is shown that the V-shaped tube 1 is placed in a single vertical plane with the lower part 2 90° tube opened end 5 placed downward and the upper part 3 with an angle A placed upward. In FIG. 2 it is shown that the supply opening 4 is a cut-off of the tube 3 in the horizontal plane. The V-tube 1 is softly connected to a rigid support 6 with two rubber bushings 7. A vibrator 8 is fixed on the V tube near the intersection between upper and lower part in order to shake it during a measurement. The V-tube shaking forces the flow of the powder inside the tube. This shaking is particularly useful with powder having bad flowing properties. A Faraday cup 9 is placed below the discharge opening 5 as present in the lower part of tube 2. Two conductive metallic cups stacked inside each other form the Faraday cup 9. The Faraday cup is connected to an electrometer 10 to measure the electric charge present in the cup. The control panel 11 of the electrometer shows the measurement result.

Figure 3:
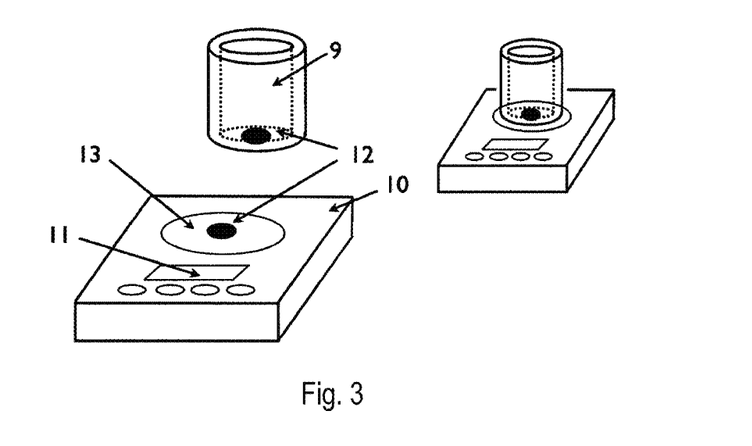
FIG. 3: illustrates an example of faraday cup (9) connection with the electrometer (10).
Figure 4:
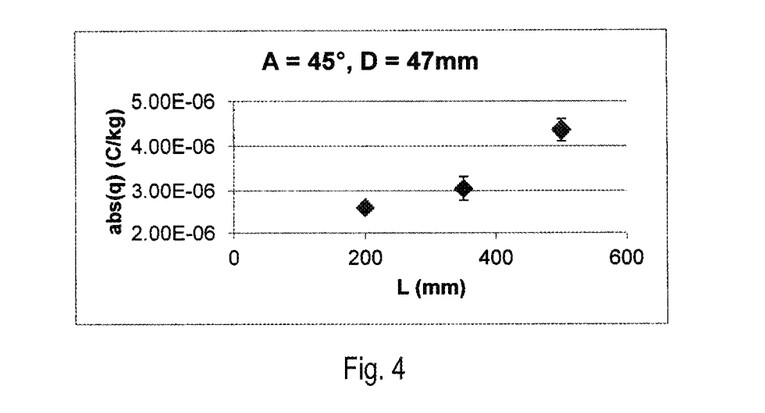
FIG. 4: illustrates results of example 1—influence of tube length L on the absolute value of the charge density inside the powder with L1=L2=L.
Figure 5:
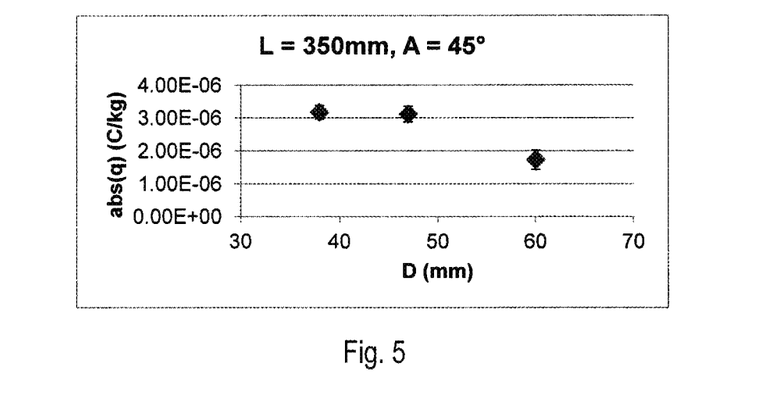
FIG. 5: illustrates results of example 2—influence of diameter D on the absolute value of the charge density inside the powder with D1=D2=D.

FIG. 3 shows the faraday cup 9 connected to the electrometer 10 with an electric connector 12 situated at the bottom of the cup. This enables the faraday cup 9 to be easily connected and disconnected from the electrometer in order to clean or to empty the cup. The electrometer 10 is optionally equipped with a USB connection to send the data to a computer. The electrometer 10 is optionally equipped with a weighting system 13 to measure the mass M of the powder situated in the faraday cup.

As mentioned earlier the invention is also directed to a measurement device for a method to measure the ability of a flowing powder to electrostatically charge comprising a conduit comprised of a straight upper part fluidly connected to a straight lower part, the upper part being positioned under a first angle with the horizontal and the lower part being positioned under a second angle with the horizontal and wherein upper and lower part are positioned under a third angle relative to each other defining a bend at the intersection of the upper and lower part, wherein the upper part is provided with a supply opening for the powder and the lower part is provided with a discharge opening to discharge powder and a faraday cup connected to an electrometer positioned relative to the discharge opening such to receive powder from the conduit. This measurement device may suitably be used in the method according the invention. The measurement device suitably further comprising means to apply a vibration to the conduit and/or means to measure the mass of the powder as discharged from the conduit to the faraday cup. Examples and further preferred embodiments of the measurement device and especially the design of the conduit are described above in relation with the method.

The use of the measurement device and illustration of the method will be illustrated by the following non-limiting examples wherein the influence of each dimension of the powder electrometer has been analyzed: the conduit length L when L1=L2=L, the internal conduit diameter D or side D when D1=D2=D, the angle A3=2A when A1=A2=A between the straight upper part and the straight lower part of the conduit. The influence of both chemical composition of the conduit and the powder is also investigated. This analysis has been performed particularly with a sample of glass beads in examples 1-5. The mass of the sample was M=150 g. The powder particle diameter ranged from 40 micrometers to 70 micrometers.

For each set of parameters, the measurements have been repeated six times to obtain the standard deviation. The value of the charge density as measured is the absolute charge and may be a positive or negative charge.

Example 1

In this example the influence of the tube length L as in FIG. 1 was investigated. The measurements with the glass beads were performed with different tube length L. The V-tube used to perform these measurements was made of stainless steel 316L. The tube angle has been fixed at A=45' and the tube internal diameter at D=47 mm. The vibration frequency was fixed at 100 Hz. The measurements were performed in a device as illustrated in FIG. 2 wherein 150 g of the glass powder was gently poured into the inlet opening of the upper part during a period of about 15 seconds. The results are presented in FIG. 4 which presents the absolute value of the charge density inside the sample after the flow in the V-tube as a function of the Length L. From the plot it may be concluded that the amount of charge inside the powder increases with the tube length L. Therefore, a V-tube formed by two long tubes will give better results. However, practically, a long V-tube is difficult to use in a laboratory setting. Suitably a tube length of between L=200 mm and L=500 mm is therefore chosen.

Example 2

Example 1 was repeated except that instead of varying the length L the internal diameter D of the tube was varied. The tube length L was fixed at 350 mm. The results are presented in FIG. 5 which presents the absolute value of the charge density inside the sample after the flow in the V-tube as a function of the internal tube diameter D. From the plot it may be concluded that the amount of charge inside the powder decreases with the internal tube diameter D. Therefore, a V-tube formed by two tubes with a small diameter will give better results. However, practically, a V-tube with a very small diameter is difficult to fill with the powder, in particular with a cohesive powder. Suitably a tube internal diameter of between D=40 mm and D=60 mm is therefore chosen.

Example 3

Figure 6:
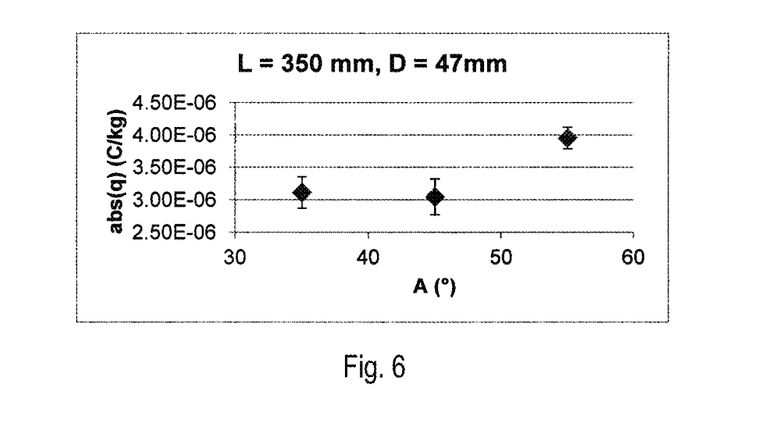
FIG. 6: illustrates results of example 3—influence of angle A on the absolute value of the charge density inside the powder with A1=A2=A.

Example 1 was repeated except that instead of varying the length L the Angle A was varied. The tube length has been fixed at L=350 mm and the tube internal diameter at D=47 mm. The results are presented in FIG. 6 which presents the absolute value of the charge density inside the sample after the flow in the V-tube as a function of the of the angle A. FIG. 6 illustrates reproducibility of the method at different angles.

Example 4

Figure 7:
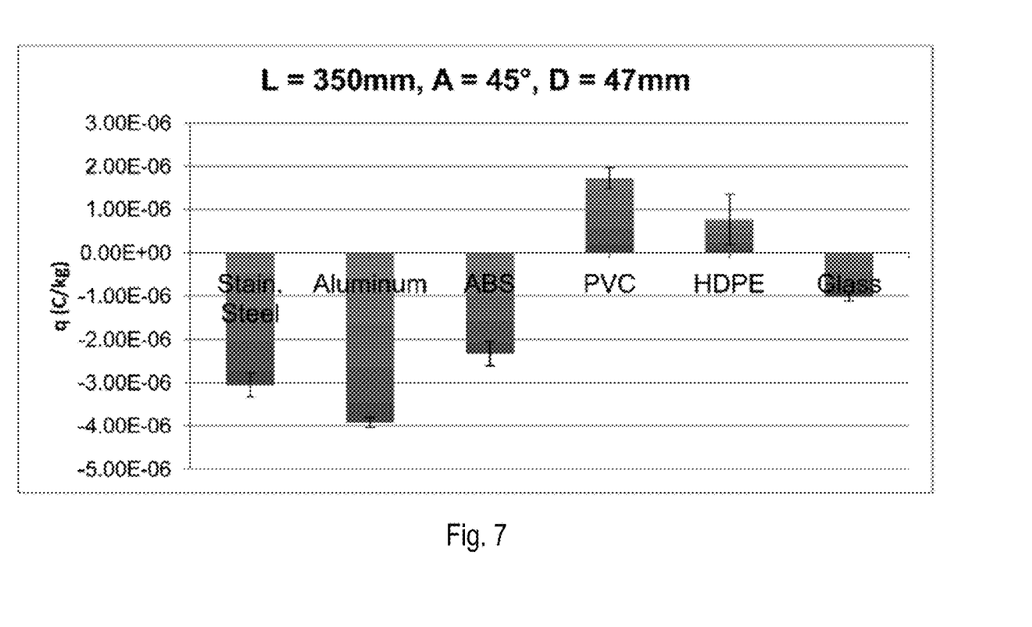
FIG. 7: illustrates results of example 4—influence of different tube material on the charge density inside the powder.

Example 1 was repeated with different tube materials: Stainless Steel 316L, Aluminum 6063-T6, borosilicate glass, ABS, PVC and HDPE. The tube angle has been fixed at A=45', the tube internal diameter at D=47 mm and the tube length at L=350 mm. FIG. 7 presents the charge density inside the sample after the flow in the V-tube for the different tube materials. These results show that the amount and the sign of the powder charge will depend strongly on the tube material. Therefore, the choice of the tube material is critical while performing a powder charging measurement aimed at predicting the properties of the powder in a commercial device.

Example 5

In this Example, we show how the powder electrometer can be used to solve practical problems. In this example the effect of an antistatic additive was investigated. Practical problems related to an excessive presence of electric charges inside a powder are commonly solved by the addition of an antistatic additive. Therefore, the best additive has to be selected. Indeed, the nature of the additive depends on the powder properties. After the additive selection process, the more efficient quantity of additive has to be determined. Performing a series of trial and error tests on a production line is usually too expensive and sometime practically impossible. Therefore, a laboratory measurement device according to the present invention is necessary to perform this selection and the dosage.

Figure 8:
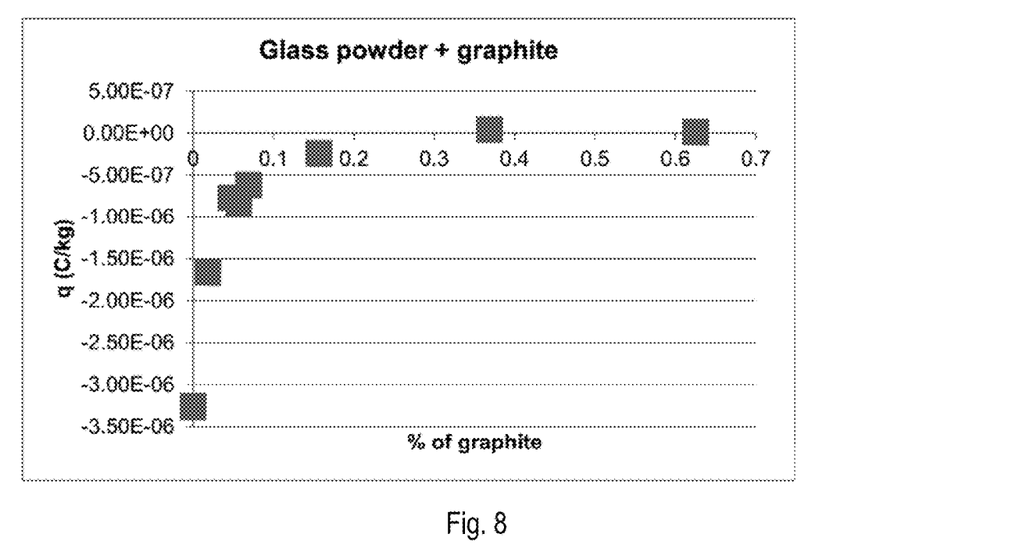
FIG. 8: illustrates results of example 5—influence of antistatic additive on the charge density inside the powder.

Example 4 was repeated with a stainless steel 316L V-tube except that different amounts of fine graphite powder as the antistatic additive was added to the powder. FIG. 8 shows the evolution of the electric charge quantity created inside a glass powder during a flow as a function of the quantity of an antistatic additive.

The effect of the additive on the electric charging process is well demonstrated by the present invention. Indeed, a small percentage in mass of this additive decreases drastically the quantity of electric charges present in the powder after the flow. This curve of FIG. 8 allows to validate or invalidate the selection of the additive. Moreover, the curve allows to select the correct amount of additive in accordance with the practical constrains. In the present case, 0.2% of graphite is sufficient to prevent the apparition of triboelectric charges.

Example 6

In this Example, we show how the powder electrometer can be used to solve practical problems. In this example the effect of a choice in lactose powders is investigated. Lactose powders are commonly used as excipients for dry powder pharmaceutical formulations. Indeed, the lactose is inert, non-toxic and cheap. Therefore, any progress in the understanding of lactose powders behaviors could have huge consequences for pharmaceutical industries. The lactose grains considered in this study are used in dry powder inhaler (DPI) applications or to make tablets. These powders are produced by Meggle under the names InhaLac® 70, InhaLac® 120, InhaLac® 130, Tablettose® 70, Tablettose® 80 and Tablettose® 100. Example 5 was repeated except that instead of the glass powder different lactose powders are measured.

Figure 9:
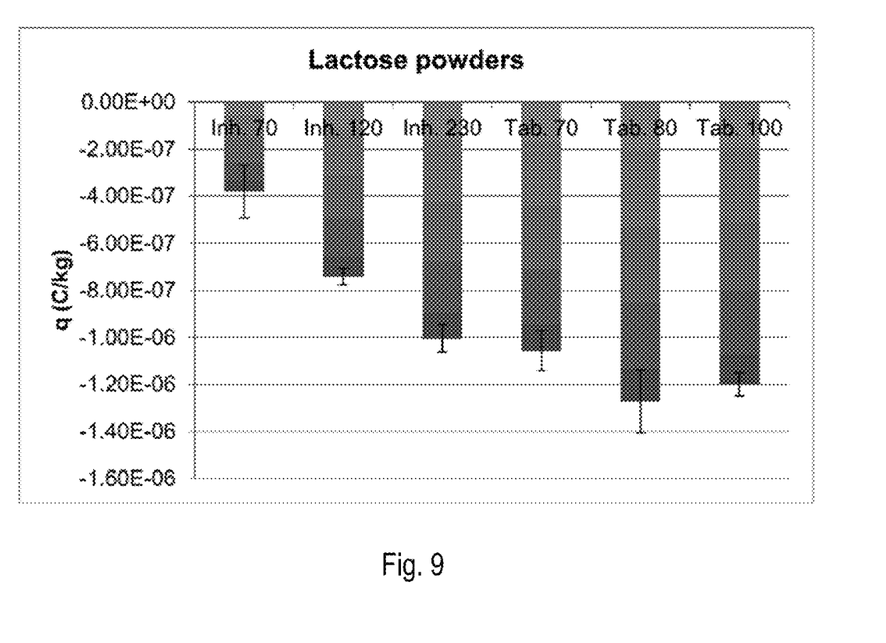
FIG. 9: illustrates results of example 6—the charge density inside the powder obtained with lactose powders.

FIG. 9 shows the charge density inside the sample after the flow in the V-tube for the different lactose samples. The different InhaLac® powders used in this study have different granulometries. For InhaLac® 70, InhaLac® 120 and InhaLac® 130, the average grain size are respectively d50=207 micrometers, d50=132 micrometers and d50=99 micrometers. As shown by the present results, the granulometry seems to influences the amount of charges created inside the powder during a flow. At the opposite, the Tablettose® powders used in this study have similar granulometries. Therefore, the triboelectric characteristics of these Tablettose® powders are also close to each other.

Example 7

In this example the influence of conduit cross-section shape was investigated. The V-shaped conduit used to perform these measurements was made of aluminum 6063-T6 conduits with a square cross section of internal side D. The angle A3=2A between the straight upper part and the lower part has been fixed at A=45°, the conduit length at L=350 mm and the conduit internal side at D=47 mm. The bottom internal side of the square cross-section conduit is positioned in a horizontal plane to generate a flow of the powder along the bottom face of the conduit. The vibration frequency was fixed at 100 Hz. Measurements were performed with 150 g of glass powder gently poured into the inlet opening of the upper part during a period of about 15 seconds. The measurement has been repeated six times to evaluate standard deviation. The obtained charge density is q=−9.07E-6 C/kg with a standard deviation of 8.66E-7 C/kg corresponding to a relative standard deviation of 9.5%. The measurement result obtained in the same conditions with the circular cross section presented in Example 4 is q=−3.92E-6 C/kg with a standard deviation of 1.17E-7 C/kg corresponding to a relative standard deviation of 3.0%.

From these results it may be concluded that the amount of charge inside the powder depends on the conduit cross-section shape because the flowing mode depends also on the conduit cross-section shape.

A circular cross-section confines the powder at the bottom part of the tube cross-section leading to a dense flow with contacting grains. A rectangular cross-section does not confine the powder and the powder is spread over the whole bottom face of the conduit leading to a sparse flow with grains rolling, sliding and bouncing on the surface. From the obtained values of relative deviations it may be also concluded that the measurement performed with the circular cross section gives more accurate results.

The invention claimed is:

1. A measurement device for a method to measure an ability of a flowing powder to have an electrostatic charge comprising
 a tube comprised of a straight upper part fluidly connected to a straight lower part, the upper and lower parts being positioned in a vertical plane, wherein the upper part being positioned at a first angle relative to a horizontal plane and the lower part being positioned at a second angle relative to the horizontal plane and wherein upper and lower part are positioned at a third angle relative to each other defining a bend at an intersection of the upper and lower part,
 wherein the upper part is provided with a supply opening for the powder and the lower part is provided with a discharge opening to discharge powder and
 a faraday cup connected to an electrometer is positioned relative to the discharge opening such to receive powder from the tube, wherein the first angle relative to the horizontal plane is between 30° and 55°, the second angle relative to the horizontal plane is between 30° and 55°, the third angle is between 60° and 110° and wherein the supply opening is a cut-off of the tube in the horizontal plane, wherein the discharge opening is a straight cut-off of the tube, and wherein the device further comprises means to measure a mass of the powder as discharged from tube to the faraday cup.

2. The measurement device according to claim 1, wherein the tube is subjected to a vibration.

3. The measurement device according to claim 1, wherein the first angle relative to the horizontal plane is equal to the second angle relative to the horizontal plane.

4. The measurement device according to claim 1, wherein the first angle relative to the horizontal plane is 45°.

5. The measurement device according to claim 1, wherein the second angle relative to the horizontal plane is 45°.

6. The measurement device according to claim 1, wherein the tube has a length between 200 and 500 mm, and an internal diameter of the tube is between 40 and 60 mm.

7. The measurement device according to claim 1, further comprising means to apply a vibration to the tube.

8. The measurement device according to claim 1, wherein the first angle relative to the horizontal plane is equal to the second angle relative to the horizontal plane.

* * * * *